Oct. 12, 1971     C. E. SCOTT     3,611,798
MAGNIFYING SCRATCH GAGE FORCE TRANSDUCER
Filed Feb. 19, 1970     2 Sheets-Sheet 1
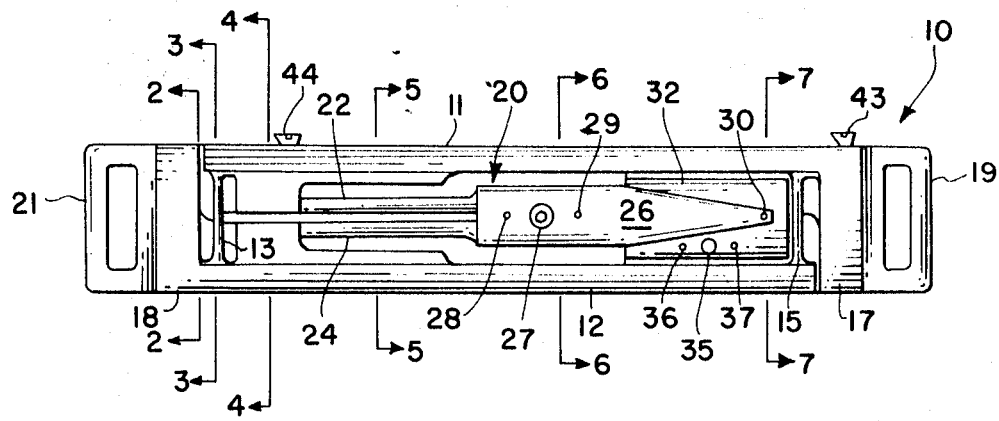
FIG. 1
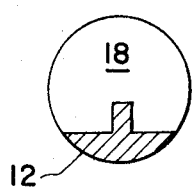     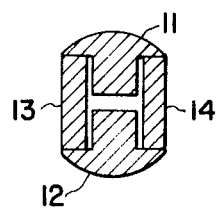     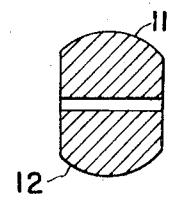
FIG. 2     FIG. 3     FIG. 4
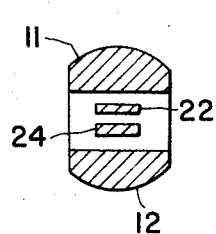     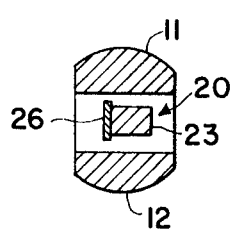     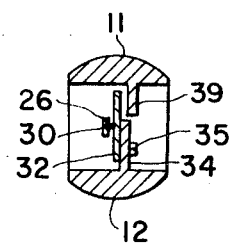
FIG. 5     FIG. 6     FIG. 7
INVENTOR.
CHARLES E. SCOTT
BY
ATTORNEYS Oct. 12, 1971  C. E. SCOTT  3,611,798
MAGNIFYING SCRATCH GAGE FORCE TRANSDUCER
Filed Feb. 19, 1970  2 Sheets-Sheet 2

INVENTOR.
CHARLES E. SCOTT
BY
ATTORNEYS

United States Patent Office 3,611,798
Patented Oct. 12, 1971

3,611,798
MAGNIFYING SCRATCH GAGE FORCE TRANSDUCER
Charles E. Scott, Yorktown, Va., assignor to the United States of America as represented by the Administrator of the National Aeronautics and Space Administration
Filed Feb. 19, 1970, Ser. No. 12,661
Int. Cl. G01l 1/04
U.S. Cl. 73—141 A
13 Claims

ABSTRACT OF THE DISCLOSURE

A passive type force transducer wherein forces exerted along the longitudinal axis of the transducer are magnified and displayed as a scratch transversely to the direction of force.

ORIGIN OF THE INVENTION

This invention was made by an employee of the National Aeronautics and Space Administration and may be manufactured and used by and for the Government of the United States for governmental purposes without the payment of any royalties thereon or therefor.

This invention relates generally to a force transducer and in particular to a passive force transducer for measuring, magnifying and recording the maximum load occurring on a given specimen being loaded. The increased activity in determining parachute and parawing deployment loadings has created a need for a small passive-type force transducer. Previously, electrical strain-gaged force transducers have been employed to measure force on a loaded specimen. These devices require long electrical lead wires and often a sufficient quantity of readout channels is not available to handle the number of devices required in full deployment tests, which make them impractical for most applications. Also, some form of expensive electronic amplifying readout equipment is required for this type of strain gage device. Passive scratch strain recorders have also previously been used to measure strain on a loaded specimen but these devices are usually quite bulky and/or require reading at several hundred times optical magnification under a precision microscope. In addition, the small scratch obtained by these known devices increased the complexity of the scriber and made, in general, the repeatability and reading accuracy of the data doubtful.

The present invention attempts to combine the advantages of these previously known force transducers while minimizing the disadvantages thereof.

Accordingly, it is an object of the present invention to provide a unique passive force transducer employing a motion magnifying principle that increases the scratch length approximately fifteen times over that obtained by previously known scratch devices.

Another object of the present invention is a new and novel scratch gage force transducer.

Another object of the present invention is a novel passive force transducer for measuring, magnifying and recording the maximum load on a given specimen being loaded.

Another object of the present invention is a small passive load-carrying device, high in natural frequency and capable of withstanding extreme environmental conditions.

Another object of the present invention is a novel passive force transducer that minimizes the error obtained in a scratch strain gage force transducer.

Another object of the present invention is a passive force transducer that records the force exerted thereon as a scratch transverse to the applied force.

Another object of the present invention is a lightweight, small, passive force transducer that can be utilized in testing large force loads on small test objects.

These and other objects are attained according to the present invention by providing an elongated transducer frame composed of a pair of mating elongated frame portions with each portion being adapted for connection to a specimen that is to be loaded so that load forces acting on the specimen will act along the longitudinal axis of the frame. The frame portions are maintained in spaced adjacency by flexure beams integrally attached thereto but which permit limited relative movement between the frame portions. An elongated beam member having a bifurcated end is disposed between the pair of elongated frame portions. One leg of the bifurcated end is integrally attached to one of the elongated frame portions and the other leg of the bifurcated end is integrally attached to the other of the elongated frame portions. An elongated scratch support or stylus carrying a scratch-inducing member is attached to the elongated beam in position for the scratch-inducing member to contact a record plate carried by one of the pair of elongated frame portions. Thus, a force exerted along the longitudinal axis of the transducer frame will induce relative movement between the elongated frame portions and corresponding relative movement between the bifurcated beam ends. This movement of the bifurcated beam magnifies the movement experienced by the frame portions and causes the scratch-inducing member to scratch the record plate in a transverse direction relative to the load force applied to the transducer and thereby permanently record the maximum load applied to the specimen. The recorded scratch length equals the magnified motion and thus is more readily readable than a scratch equally only actual movement of the parts.

Although some optical magnification of the results is still required, a simple bench scope with 20–30 magnification power is sufficient to obtain accurate readings.

A more complete appreciation of the invention and many of the attendant advantages thereof will be readily apparent as the same becomes better understood by reference to the following detailed description when considered in connection with the accompanying drawings wherein:

FIG. 1 is a view of the passive type force transducer of the present invention;

FIG. 2 is a sectional view of the transducer shown in FIG. 1 and taken along line 2—2;

FIG. 3 is a sectional view of the transducer shown in FIG. 1 and taken along line 3—3;

FIG. 4 is a sectional view of the transducer shown in FIG. 1 and taken along line 4—4;

FIG. 5 is a sectional view of the tranducer shown in FIG. 1 and taken along line 5—5;

FIG. 6 is a sectional view of the transducer shown in FIG. 1 and taken along line 6—6;

FIG. 7 is a sectional view of the transducer shown in FIG. 1 and taken along line 7—7;

Figure 8:
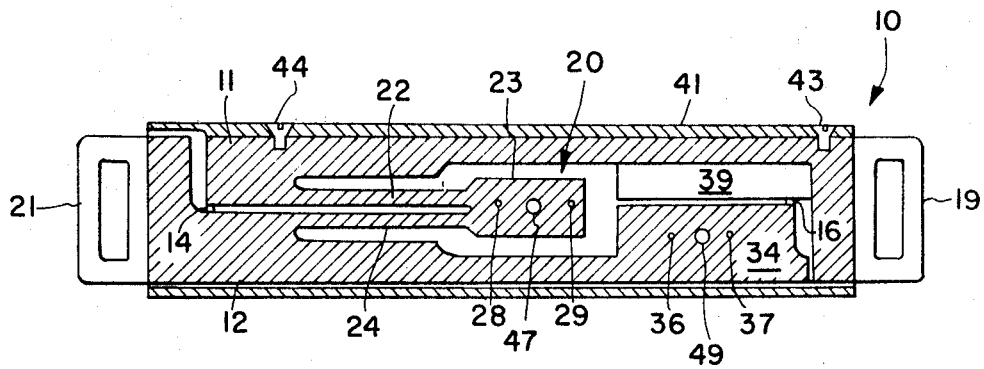
FIG. 8 is a longitudinal section of the transducer shown in FIG. 1 taken along a plane parallel with the drawing and illustrating the protective cover employed when utilizing the transducer in a test.

Referring now more particularly to the drawings wherein like reference numerals designate the same or identical parts throughout the several views and more specifically to FIG. 1, there is shown a passive type force transducer according to the present invention and generally designated by reference numeral 10. Transducer 10 includes two substantially identical elongated frame portions as designated by reference numerals 11 and 12. Frame portions 11 and 12 are maintained in spaced adjacency by a plurality of I-beam members 13, 14 (FIG. 3), 15 and 16 (FIG. 8). Two flexure I-beams are used at each end of the transducer for assuring pure translational motion in the direction of the applied force, and also to absorb any crossloads that may be experienced during a test. Each of the I-beams is integrally attached at its opposite ends to one of the frame portions 11 and 12 and are constructed so as to permit limited flexing thereof under a load and will, accordingly, permit limited relative sliding movement of frame portions 11 and 12. Each of the elongated frame portions 11 and 12 is provided with a terminal cylindrical end portion as designated, respectively, by reference numerals 17 and 18. Identical segments 19 and 21 are integral, respectively, with cylindrical ends 17 and 18 and serve as connectors to attach transducer 10 to a test specimen that is to be subjected to a load.

An elongated motion magnifying beam, generally designated by reference numeral 20, is disposed between elongated frame portions 11 and 13. Motion magnifying beam 20 and also serves to protect record plate 32. As shown thereof. The segments or legs of the bifurcation are designated by reference numerals 22 and 24. Leg 22 is integral with elongated frame portion 11 while leg 24 is integral with frame portion 12. An elongated scratch support member or stylus 26 is attached to the closed end 23 of motion magnifying beam 20 by way of screw 27 and positioning pins 28 and 29. A steeel point or scratch inducing member 30 is carried by scratch support 26 in position to contact a record plate 32. Record plate 32 is attached to fillet 34, which is integral with elongated frame portion 12, by way of screw 35 and positioning dowel pins 36 and 37. Screws 35 extend through clearance hole 49 (FIG. 8) and engages a tapped hole in record plate 32. A fillet 39 also extends from elongated frame 11 but this fillet of material is disposed spaced from record plate 32. Fillet 34 serves to strengthen elongated frame portion 11 and acts as an aid in assembling the transducer.

Referring now to FIG. 8, transducer 10 is provided with a protective tubular sleeve 41 when in the final assembled condition. Sleeve 41 prevents dust and other debris from hampering the operation of motion magnifying beam 20 and also serves to protect record plate 32. As shown in this figure, sleeve 41 is attached to elongated frame portion 11 by way of two screws, as designated by reference numerals 43 and 44. The sleeve 41 is not attached to elongated frame portion 12 but is slightly spaced in slidable relationship with portion 12. By this arrangement sleeve 41 does not impede relative movement between frame portions 11 and 12. The closed end 23 of motion magnifying beam 20 is also more clearly shown in this figure with the positioning pins 28 and 29 for scratch support 26 and the tapped hole 47 for screw 27 also being shown. Similarly, the clearance hole 49 for screw 35 in fillet 34 is shown along with positioning pins 36 and 37. Calibration of transducer 10 is achieved by deadweight loading and measurement of the scratch length. This requires removing and reinstalling the stylus assembly 26 with a new record plate 32 to render transducer 10 ready for use. A reference "zero" may be made on record plate 32 through the stylus access hole with a sharp tool to distinguish between a positive and negative force recorded during a test.

The operation of the invention is now believed apparent. Tranducer 10 is attached by any conventional means by way of connectors 19 and 21 to a test specimen that is to be force-loaded in such manner that the load forces applied will act along the longitudinal axis of transducer 10. As a load force is exerted on the specimen this force will also act on elongated frame portions 11 and 12 and tend to force these portions apart. I-beams 13, 14, 15 and 16 retain frame portions 11 and 12 together but flex sufficiently to permit limited relatively sliding movement between portions 11 and 12. This limited sliding movement of portions 11 and 12 also causes integrally attached legs 22 and 24 of beam 20 to undergo relative movement which, when transferred to solid end 23 of beam 20, causes end 23 to undergo transfer movement. This transverse movement of end 23 causes scratch support 26 to move and the attached scratch inducing member 30 to permanently mark or scratch record plate 32. Scratch support 26 is constructed of spring steel or the like and adapted to bias scratch-inducing member 30 into intimate contact with record plate 32 at all times. The length of motion magnifying beam 20 relative to the limited movement of frame portions 11 and 12 is the determining factor in the magnification of the recorded output scratch. That is, motion magnification for the recorded scratch is obtained through the eccentric beam 20 in the center of the transducer which converts translation motion to a rotational motion, with the effective center of rotation being at the half length of beam 20.

Figure 9:
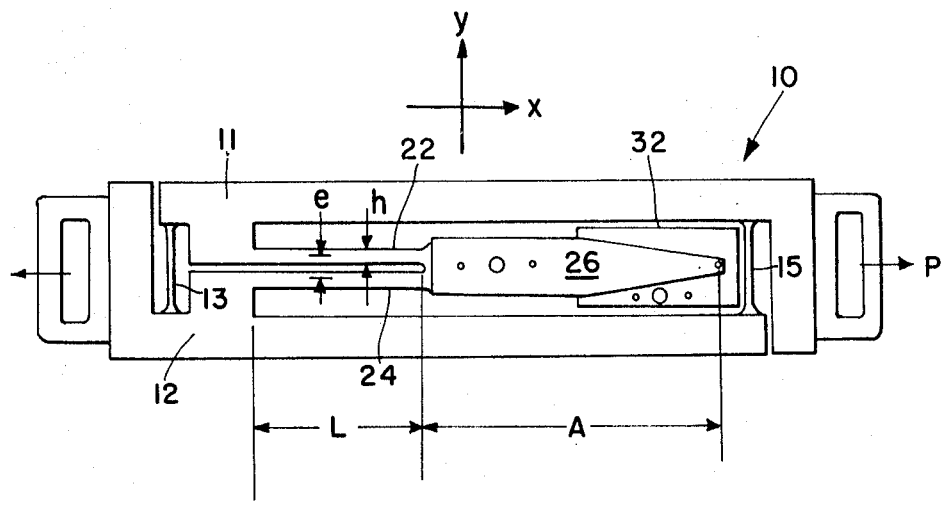
FIG. 9 is a somewhat schematic representation of the transducer shown in FIG. 1 and showing the magnification principle calculations.

Referring now more particularly to FIG. 9, the principle of operation for the passive force transducer of the present invention will now be described. The magnifying feature of the present invention is controlled by motion magnifying beam 20, which for any motion in the $x$ direction, has a corresponding motion in the $y$ direction. This motion in the $y$ direction can be made to be much greater than the $x$ direction by physically varying the dimensions of the magnifying beam. The deflection of beam 20 in the $x$ direction may be derived at mathematically by:

$$\alpha x = \frac{12 M L_e}{E b h^3} + \frac{4 M L}{E e b h} \quad (1)$$

where $M = Pe/2$
$L$ = the length of the bifurcated portion of beam 20, inches
$e$ = the distance between the longitudinal centers of legs 22 and 24, inches
$E$ = Young's modulus of elasticity, pounds per square inch
$b$ = depth or height of legs 22 and 24 as measured transversely to $h$, inches
$h$ = width of one of legs 22 and 24, inches
$P$ = force load, pounds The deflection of the $y$ direction of the same beam is:

$$\alpha y = \frac{6 M L^2}{E b h^3} + \frac{12 M L A}{E b h^3} \quad (2)$$

where $A$ = distance between the bifurcated portion of beam 20 and scratch-inducing member 30, M, L, E, $b$, P and $h$ are identical to those values in Equation 1.

The magnification of this beam 20 therefore becomes:

$$Z = \frac{\alpha y}{\alpha x} = \frac{\frac{6 M L^2}{E b h^2} + \frac{12 M L A}{E b h^3}}{\frac{12 M L e}{E b h^3} + \frac{4 M L}{E e b h}}$$

or $$Z = \frac{3}{2l} \left[ \frac{L + 2A}{3 + \left(\frac{h}{e}\right)^2} \right]$$

$$Z = \frac{L + 2A}{2e} \left[ \frac{1}{1 + \frac{1}{3}\left(\frac{h}{e}\right)^2} \right] \quad (3)$$

Since the magnifying beam is paralleled by flexure I-beams 13, 14, 15 and 16, it is necsesary to include the flexure spring constant K when determining a total $x$ deflection. This constant may be calculated in a conventional manner for determining the constant in a parallel spring system. From the total $x$ deflection the above formulae can be used to determine the $y$ deflection of magnifying beam 20. In addition to measuring motion, the motion magnifying beam 20 and I-beams 13, 14, 15 and 16 are the supporting structure which must carry the force load P and, accordingly, the stress on the beams must be kept within reasonable values.

Specific test models of the present invention have been constructed having design ranges of 100, 150 and 300 pounds with the overall dimensions of the transducers being the same for each load range. In these test models the entire frame and beams were constructed as one piece of Vascomax 300 margaring heat-treated steel. Vascomax 300 is a trade name of the Vanadium-Alloys Steel Company of Latrode, Pa. The scratch plate or record plate 32 employed was 17–4 PH stainless steel plate and, as described hereinbefore, attached to fillet 34 by dowel pins 36 and 37 and screw 35. The scratch support or stylus assembly 26 is of suitable spring steel such, for example, Swedish Blue Steel with a heat-treated 17–4 PH steel point for the scratch-inducing member 30. 17–4 PH steel is a trade name product of the Armco Steel Corporation, Middletown, Ohio. The design load deflection along the longitudinal axis for these devices is approximately 0.0025 inch and the recorded scratch length for each design is approximately 0.038 inch. Thus, the magnification factor $z$ becomes 14.9. The total weight of each unit is approximately 0.12 pound with a natural frequency of 3100 Hz. and 4570 Hz., respectively, for the 150- and 300-pound range.

Although the invention has been described relative to a specific embodiment, the magnifying beam principle obviously could be employed in other types of passive gages. For example, this type of gage could be employed to measure the strain in a separate structure where it would be cemented, or screwed, to the structure being tested. Also, gages of this type could be employed as a motion-activating relay switch where the stylus assembly would act as one of the electrical contacts. It is to be understood, therefore, that the foregoing disclosure relates only to the preferred embodiment of the present invention and that numerous modifications and variations are possible in the light of the above teachings, as will be readily apparent to those skilled in the art, without departing from the spirit and scope of the invention as set forth in the appended claims.

What is claimed as new and desired to be secured by Letters Patent of the United States is:

1. A passive type force transducer comprising:
   an elongated transducer frame, said frame including a pair of elongated frame portions, said frame portions being relatively movable for a limited distance in response to longitudinal forces acting on said frame,
   means carried by said frame for magnifying motion of the relatively movable portion,
   scratch means for recording the magnified movement,
   said pair of elongated frame portions being disposed in overlying relationship along a major portion of their length,
   each of said pair being provided with at least one area of exterior surface formed as an arc, and
   said pair being positioned such that the area circumscribed by the arcuate surfaces will be in the form of a cylinder.

2. The passive type force transducer of claim 1 including,
   means connecting and retaining said pair of elongated frame portions in spaced adjacency while permitting limited relative sliding movement thereof.

3. The passive type force transducer of claim 2 including,
   a tubular sleeve snugly positioned above the major length of said elongated frame portions,
   said tubular sleeve being attached to one of said portions and freely slidably engaging the other of said portions.

4. The passive type force transducer of claim 2 wherein said means connecting and retaining said pair of elongated frame portions in spaced adjacency comprises a plurality of I-beam members disposed in transverse integral relationship with said pair of elongated frame portions.

5. The passive type force transducer of claim 1 wherein said means carried by said frame for magnifying the movement of the relatively movable parts includes
   an elongated beam positioned between said pair of elongated frame portions,
   said elongated beam being bifurcated at one end thereof,
   one leg of said bifurcated end being integrally attached to one of said elongated portions and the other leg of said bifurcated end being integrally attached to the other of said elongated portions.

6. The passive type force transducer of claim 5 wherein said scratch means for recording the magnified movement includes,
   an elongated scratch support extending from said elongated beam,
   scratch means carried by said elongated support, and
   a record plate carried by one of said pair of elongated frame portions in position to be contacted by said scratch means.

7. A magnifying scratch gage force transducer for measuring, magnifying and recording the maximum load on a specimen under a force load, comprising:
   an elongated transducer support frame having two substantially identical halves,
   I-beam means integral with each said half and disposed transversely to said halves and serving to maintain said halves in fixed spaced adjacency,
   connecting means on one end portion of each said half for attaching said frame to a test specimen that is to be subjected to load forces,
   an elongated motion magnifying beam disposed between said halves,
   said motion magnifying beam having a bifurcated end with the segments thereof being integral, one each, with said halves,
   an elongated scratch support attached to the other end of said motion magnifying beam,
   scratch means carried by said support,
   a record plate attached to one of said halves in position to be contacted by said scratch means,
   said scratch support having the inherent physical property characteristic of biasing said scratch means into continuous contact with said record plate, whereby
   when said transducer frame is attached to a specimen and a force load applied to the specimen along the length of said frame the two said halves will tend to move apart but will be maintained together solely by said I-beam means, said I-beam means having the inherent property characteristic of undergoing limited flexing movement will, however, permit limited relative sliding movement of said halves with said sliding movement causing one end of said bifurcated magnifying beam to move relative to said other end thereof with this motion being magnified by said motion magnifying beam and causing said scratch support to under arcing movement and the scratch means carried thereby to scratch said record plate for a distance transversely, but indicative of the force applied to said specimen.

8. The magnifying scratch gage force transducer as in claim 7 including a protective sleeve for said transducer support frame extending substantially along the length thereof, said sleeve being attached to only one of said halves to thereby permit movement of said halves relative to each other.

9. A passive type force transducer for measuring, magnifying and recording the load force applied to a test specimen under a force load, comprising:
   an elongated transducer support frame,
   said frame including two substantially identical elongated halves, flexure I-beam means integral with said halves and serving to maintain said halves in spaced longitudinal adjacency, means on one end of each said half for attaching said frame to a test specimen, an elongated bifurcated magnifying beam disposed between said halves, one segment of said bifurcated beam being integral with one of said halves, the other segment of said bifurcated beam being integral with the other of said halves, an elongated scratch support attached to and extending from said bifurcated beam, scratch means carried by said scratch support, a record plate attached to one of said halves and in position to be contacted by said scratch means, said scratch support serving to bias said scratch means into contact with said record plate, whereby when said support frame attached to a test specimen in such manner that load forces will act along the longitudinal axis of said frame, the two said halves will undergo limited relative sliding movement due to the flexing of said flexure I-beams, proportional to the load force applied, and the bifurcated beam sections will also undergo limited relative movement forcing the end of said scratch support to move transversely to the direction of load force and causing said scratch means to make a record on said record plate indicative of the load force applied to said specimen.

10. A passive type force transducer for measuring, magnifying and recording the load force applied to a test specimen under a force load, comprising:

an elongated transducer support frame, said frame being divided into substantially first and second elongated frame portions, attachment means on each said first and second portions whereby a force load may be applied along the longitudinal axis of said frame and tend to separate said first and said second portions, flexure means integral with said first and said second frame portions serving to maintain said portions in spaced adjacency while permitting limited relative sliding movement therebetween when a load force is applied along the longitudinal axis of said frame, means for magnifying any relative sliding movement between said first and second frame portion, and means for recording the magnified movement as a measure of the force applied to said frame.

11. A passive type force transducer as in claim 10 wherein:

said flexure means consists of a pair of I-beams at each end of said first and second portions.

12. The passive type force transducer of claim 10 wherein one end of each of said first and second elongated frame portions is in the form of a cylinder and the other end of each said first and second elongated frame portions is provided with an exterior surface formed on an arc coincident with the cylindrical end portion.

13. The passive type force transducer of claim 10 wherein each said cylindrical end portion is provided with an extension serving as said attachment means to permit attachment of said transducer to a force load test specimen.

References Cited
UNITED STATES PATENTS

| | | | |
|---|---|---|---|
| 1,999,075 | 4/1935 | Bauer et al. | 33—147 D |
| 2,330,959 | 10/1943 | De Forest | 73—89 |

JERRY W. MYRACLE, Primary Examiner

U.S. Cl. X.R.

73—88 R